United States Patent
Chen et al.

(10) Patent No.: US 9,435,712 B2
(45) Date of Patent: Sep. 6, 2016

(54) OTDR SIGNAL INJECTION FOR MULTI-BAND OPTICAL POWER BALANCING

(71) Applicant: Verizon Patent and Licensing Inc., Arlington, VA (US)

(72) Inventors: David Z. Chen, Richardson, TX (US); Wenjia Wang, Westborough, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 81 days.

(21) Appl. No.: 14/583,950

(22) Filed: Dec. 29, 2014

(65) Prior Publication Data

US 2016/0187224 A1 Jun. 30, 2016

(51) Int. Cl.
G01N 21/00 (2006.01)
G01M 11/00 (2006.01)
H04B 10/079 (2013.01)
H04B 10/071 (2013.01)
H04Q 11/00 (2006.01)

(52) U.S. Cl.
CPC ..... *G01M 11/3127* (2013.01); *G01M 11/3109* (2013.01); *G01M 11/3181* (2013.01); *H04B 10/071* (2013.01); *H04B 10/07955* (2013.01); *H04Q 2011/0079* (2013.01)

(58) Field of Classification Search
CPC .............. G01M 11/3181; G01M 11/3127; G01M 11/3109; G01N 2201/0886; H04B 10/07955; H04B 10/071
See application file for complete search history.

(56) References Cited

U.S. PATENT DOCUMENTS

| 4,958,926 | A  | * | 9/1990 | Bu-Abbud | H01S 5/06835 250/205 |
| 6,229,599 | B1 | * | 5/2001 | Galtarossa | G01M 11/3181 356/73.1 |
| 6,724,469 | B2 | * | 4/2004 | Leblanc | G01M 11/3181 356/73.1 |
| 2002/0105695 | A1 | * | 8/2002 | DeGrange, Jr. | H04B 10/296 398/97 |
| 2008/0068586 | A1 | * | 3/2008 | Kishida | G01B 11/18 356/32 |
| 2008/0106745 | A1 | * | 5/2008 | Haber | G01B 11/18 356/519 |
| 2009/0244522 | A1 | * | 10/2009 | Cyr | G01M 11/3181 356/73.1 |
| 2014/0233019 | A1 | * | 8/2014 | Chen | G01M 11/088 356/73.1 |

* cited by examiner

*Primary Examiner* — Kara E Geisel
*Assistant Examiner* — Maurice Smith

(57) ABSTRACT

A system includes an Optical Time Domain Reflectometer (OTDR) that injects a first OTDR signal at a first optical wavelength, a first power level and a first polarization state into an optical fiber. The system further includes an OTDR monitor that monitors multi-band optical signals on the optical fiber, selects a second power level and a second polarization state based on the monitoring of the multi-band optical signals, and determines parameters associated with the optical fiber based on the monitoring. The OTDR injects a second OTDR signal at the first optical wavelength, the selected second power level and the selected second polarization state into the optical fiber. The system operates to allow un-balanced power levels across multiple wavelength bands to be balanced due to inter-channel Raman power shift.

20 Claims, 7 Drawing Sheets

OTDR SIGNAL INJECTION FOR MULTI-BAND OPTICAL POWER BALANCING

BACKGROUND

A passive optical network (PON) is a network that uses unpowered optical splitters to enable a single optical fiber to serve multiple premises. A PON typically includes an optical line terminal (OLT) at one end of the network, and multiple optical network units (ONUs) near the end users of the network. Optical signals are transmitted from the OLT via an optical fiber of the network, and transmitted to each of multiple premises via one or more unpowered optical splitters. Use of the unpowered optical splitters attenuates the optical signals such that the signal strength decreases relative to noise and interference over the optical fiber(s) of the network.

DETAILED DESCRIPTION OF THE PREFERRED EMBODIMENTS

The following detailed description refers to the accompanying drawings. The same reference numbers in different drawings may identify the same or similar elements. The following detailed description does not limit the invention as claimed.

Embodiments described herein utilize optical signals, transmitted from optical time domain reflectometers (OTDRs) for determining performance parameters associated with an optical fiber of a passive optical network, to balance multi-band optical power on the optical fiber. By transmitting one or more high power OTDR signals at specific wavelengths, power levels, and polarization states, the phenomenon of inter-channel Raman power shift may be used to shift power from lower wavelength OTDR signals to other higher wavelength signals on the optical fiber thereby balancing out the power levels across multiple bands, such as across optical bands spanning the wavelengths of about 1260 nm to about 1675 nm. The wavelengths, power levels and/or polarization states of the one or more OTDR signals may be iteratively adjusted to achieve the balancing of the multi-band optical power on the optical fiber. Balancing of the multi-band optical power permits an extension of the length of the optical fiber due to the boosted power levels across the multiple bands. Therefore, using high power OTDR signals for multi-band power balancing enables the fiber lengths of optical fibers within an optical network to be increased.

Figure 1:
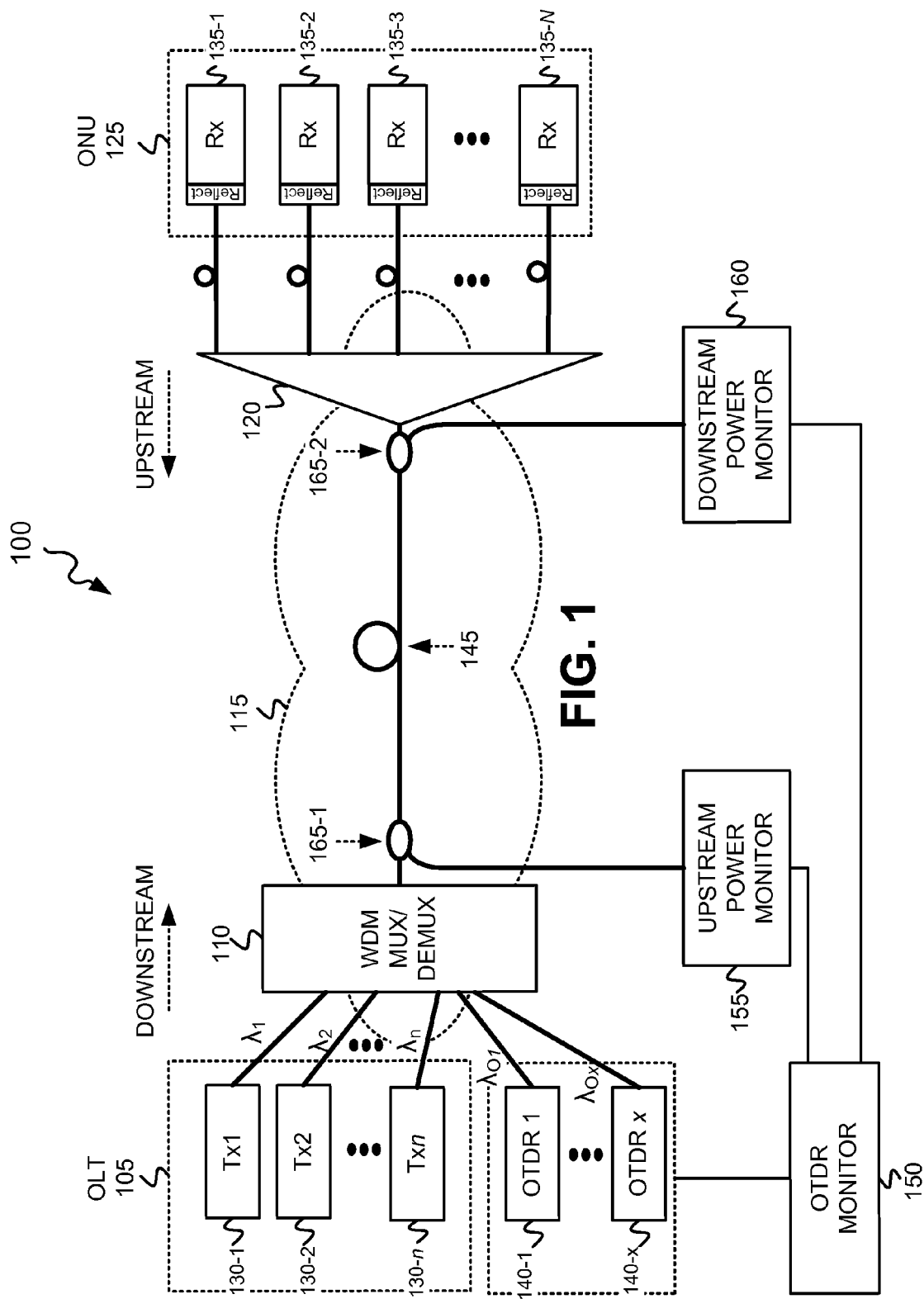
FIG. 1 is a diagram that illustrates an exemplary optical network environment in which optical signals associated with optical time domain reflectometry are used for balancing multi-band optical power levels on an optical fiber.

FIG. 1 illustrates an exemplary optical network environment 100 in which optical signals associated with optical time domain reflectometry are used for balancing multi-band optical power levels on an optical fiber. Optical network environment 100 includes an optical line terminal (OLT) 105, a wavelength division multiplexer/demultiplexer (WDM MUX/DEMUX) 110, an optical network 115, an optical splitter(s) 120, an optical network unit (ONU) 125, Optical Time Domain Reflectometers (OTDRs) 140-1 through 140-x, an OTDR monitor 150, an upstream power monitor 155, and a downstream power monitor 160. Optical network 115 carries optical signals, via an optical fiber(s), from multiple different optical transmitters 130-1 through 130-n (generically and individually referred to herein as "Tx 130" and collectively referred to herein as "Txs 130") of OLT 105 to multiple different optical receivers 135-1 through 135-N (generically and individually referred to herein as "Rx 135" and collectively referred to herein as "Rxs 135") of ONU 125, where n and N each include a same, or a different, positive integer greater than or equal to one. Optical network 115 further carries optical signals transmitted from Optical Time Domain Reflectometers (OTDRs) 140-1 through 140-x (generically and individually referred to herein as "OTDR 140" and collectively referred to herein as "OTDRs 140"), reflected from reflectors at ONU 125, and possibly transmitted on the upstream by optical transmitters (not shown).

Each of optical transmitters 130-1 through 130-n of OLT 105 may include any type of light source that transmits optical signals for transit on the downstream over optical network 115 to at least one of optical receivers 135-1 through 135-N of ONU 125. OLT 105 may, in other implementations, be any type of terminal that includes a light source, such as, for example, a terminal connected to a metro-Ethernet, a terminal connected to a wireless network, a terminal connected to a video source, etc. Each of optical transmitters 130-1 through 130-n may transmit optical signals at an optical wavelength from one or more bands of optical wavelengths. For example, Tx 130 may transmit optical signals at a wavelength within an "O" band ranging from 1260 to 1360 nanometers (nm). Other bands may include the "E" band from 1360 to 1460 nm, the "S" band from 1460-1530 nm, the "C" band, from 1530-1560 nm, the "L" band from 1560-1625 nm, and/or the "U" band from 1625-1675 nm.

Each OTDR 140 includes a device that transmits high power OTDR optical signals over an optical fiber 145 of network 115, and measures reflected optical signals corresponding to the transmitted high power OTDR optical signals to determine various parameters associated with fiber 145 based on knowledge of the wavelength, power level, and/or polarization of the transmitted and reflected OTDR optical signals. For example, the reflected optical signals may be used to estimate a length, an overall attenuation, and/or optical return loss of fiber 145. As a further example, OTDR 140 may use the reflected optical signals corresponding to the high power OTDR optical signals to locate faults on optical fiber 145, and/or faults between optical fiber 145 and receiver Rx 135, including at optical splitter 120, and a last fiber leg between optical splitter 120 and receiver Rx 135.

OTDR monitor 150 includes a computational device that issues instructions to each of OTDRs 140-1 through 140-x to control the transmission of OTDR signals. OTDR monitor 150 may issue instructions to each of OTDRs 140-1 through 140-x to control the output power level, the optical wavelength and/or the polarization state (e.g., polarization angle, which is represented herein by Pol ∠) of each of the transmitted optical signals. OTDR monitor 150 may additionally receive signal measurement data from OTDRs 140-1 through 140-x that includes power level and wavelength data associated with reflected OTDR signals, or with other optical signals, received via optical fiber 145. In order to make the system work efficiently, the downstream and upstream signals are set to be orthogonal to each other, and the power levels and polarization states of the high power OTDR optical signals are tunable by OTDR monitor 150.

WDM MUX/DEMUX 110 includes a device that, on the downstream, multiplexes optical signals of different wavelengths from optical transmitters 130-1 through 130-n, and OTDRs 140-1 through 140-x, to a single optical fiber (e.g., optical fiber 145). For example, as shown in FIG. 1, transmitters 130-1 through 130-n transmit optical signals at respective optical wavelengths $\lambda_1$-$\lambda_n$, and WDM MUX/DEMUX 110 multiplexes all of the optical signals onto optical fiber 145. As further shown in FIG. 1, OTDRs 140-1 through 140-x transmit OTDR optical signals at respective optical wavelengths $\lambda_{O1}$-$\lambda_{Ox}$, and multiplexes all of the OTDR optical signals onto optical fiber 145 along with the optical signals from optical transmitters 130-1 through 130-n. WDM MUX/DEMUX 110 additionally, on the upstream, demultiplexes multiple different wavelengths received via a single optical fiber (e.g., optical fiber 145) to multiple different optical outputs, with each optical output having a different optical wavelength. Certain wavelengths (e.g., $\lambda_1$-$\lambda_n$) of the optical signals demultiplexed on the upstream by WDM MUX/DEMUX 110 are demultiplexed to receivers (not shown in FIG. 1) in OLT 105. As depicted in FIG. 1, WDM MUX/DEMUX 110 demultiplexes reflected optical signals at wavelength $\lambda_{O1}$ to OTDR 140-1, and reflected optical signals at wavelength $\lambda_{Ox}$ to OTDR 140-x.

Optical network 115 (shown with dashed lines in the figure) may include a Passive Optical Network (PON) that further includes network components (including at least one connecting optical fiber) on an optical path(s) between OLT 105 and ONU 125. In the example of FIG. 1, optical network 115 is shown as including a single optical fiber 145 connected between WDM MUX/DEMUX 110 and optical splitter 120. In one implementation, optical fiber 145 may have a length ranging from about 10 to about 50 kilometers (kms).

Optical splitter(s) 120 may include one or more optical splitters that split input optical signals to multiple outputs such that each of optical receivers 135-1 through 135-N receives the wavelength division multiplexed optical signals transmitted over optical network 115. Optical splitter(s) 120 may, for example, include multiple 50/50 optical splitters cascaded together to enable a single fiber input to provide an output to N fiber outputs (i.e., to N optical receivers).

Each of optical receivers 135-1 through 135-N (where N is a positive integer greater than or equal to one) of ONU 125 receives the optical signals, via optical fiber 145 and splitter(s) 120, over a respective last fiber leg. Each of optical receivers 135-1 through 135-N includes optical filtering and optical detection components for receiving, filtering, detecting, and processing optical signals received over one or more optical wavelengths in one or more optical bands. Optical receiver 135 may receive and detect optical signals at wavelengths within the O, E, S, C, L or U bands, or some portion of such bands. As shown in FIG. 1, each of optical receivers 135-1 through 135-N includes a reflector (designated "reflect") at the input side of the receiver connected to the last fiber leg. Each reflector includes a suitable material designed to reflect optical wavelengths that correspond to the wavelengths of OTDR signals injected into the optical transmission path by one or more of OTDRs 140-1 through 140-x, but doesn't reflect signals at other optical wavelengths such as the wavelengths associated with optical signals transmitted from a specific Tx 130. For example, each reflector at a receiver 135 may reflect optical signals within an optical wavelength range of $\lambda_1$-$\lambda_2$ nm, where $\lambda_2 > \lambda_1$ and where OTDR signals are then injected into the optical network 115 in the range of $\lambda_1$-$\lambda_2$ nm. OTDR signals within the range of $\lambda_1$-$\lambda_2$ nm are reflected back through the optical network 115 to return to OTDRs 140-1 through 140-x. Each reflector may be fixed, or may be dynamically tunable.

ONU 125 may, in other implementations, be any unit or device that includes optical detection components, such as, for example, an optical receiver connected to a local area network (LAN) (e.g., Ethernet), an optical receiver connected to a wireless network, and/or an optical receiver connected to a metropolitan area network (MAN) (e.g., a metro-Ethernet).

Upstream power monitor 155 may, via a tap on the downstream end of optical fiber 145, monitor the power levels on multiple bands of optical wavelengths transmitted or reflected from the upstream end of optical fiber 145, such as, for example, power levels wavelengths in the O, E, S, C, L and/or U bands. In one implementation, as shown in FIG. 1, the tap at the downstream end of optical fiber 145, to measure the upstream optical signals, may be made via an optical coupler 165-1. Other methods of tapping optical signals on the downstream end of optical fiber 145, however, may be used (e.g., a tap at WDM MUX/DEMUX 110). Upstream power monitor 155 may provide data of the measured power levels, and associated optical wavelengths, of the upstream optical signals to OTDR monitor 150 via an intervening link or network (shown as a single link in FIG. 1).

Downstream power monitor 160 may, via a tap on the upstream end of optical fiber 145, monitor the power levels on multiple bands of optical wavelengths transmitted from the downstream end of optical fiber 145, such as, for example, power levels wavelengths in the O, E, S, C, L and/or U bands. In one implementation, as shown in FIG. 1, the tap at the upstream end of optical fiber 145, to measure the downstream optical signals, may be made via an optical coupler 165-2. Other methods of tapping optical signals on the upstream end of optical fiber 145, however, may be used (e.g., tapping into an output of optical splitter 120). Downstream power monitor 160 may provide data of the measured power levels, and associated optical wavelengths, of the downstream optical signals to OTDR monitor 150 via an intervening link or network (shown as a single link in FIG. 1). Upstream power monitor 155 and downstream power monitor 160, therefore, enable power levels of optical signals across the multiple bands carried by optical fiber 145 to be monitored and reported back to OTDR monitor 150. Upstream power monitor 155 and downstream power monitor 160 may monitor optical signal parameters and/or network parameters other than, or in addition to, power levels.

The configuration of network components of network environment 100 shown in FIG. 1 is for illustrative purposes. Other configurations may be implemented. Therefore, network environment 100 may include additional, fewer and/or different components, that may be configured in a different arrangement, than that depicted in FIG. 1. For example, a single OLT 105, a single ONU 125, a single WDM MUX/DEMUX 110 and a single power splitter 120 are depicted in FIG. 1. In other implementations, multiple OLTs 105, multiple WDM MUX/DEMUXs 110, multiple optical splitters 120 and multiple ONUs 125 may be connected to optical network 115.

Figure 2:
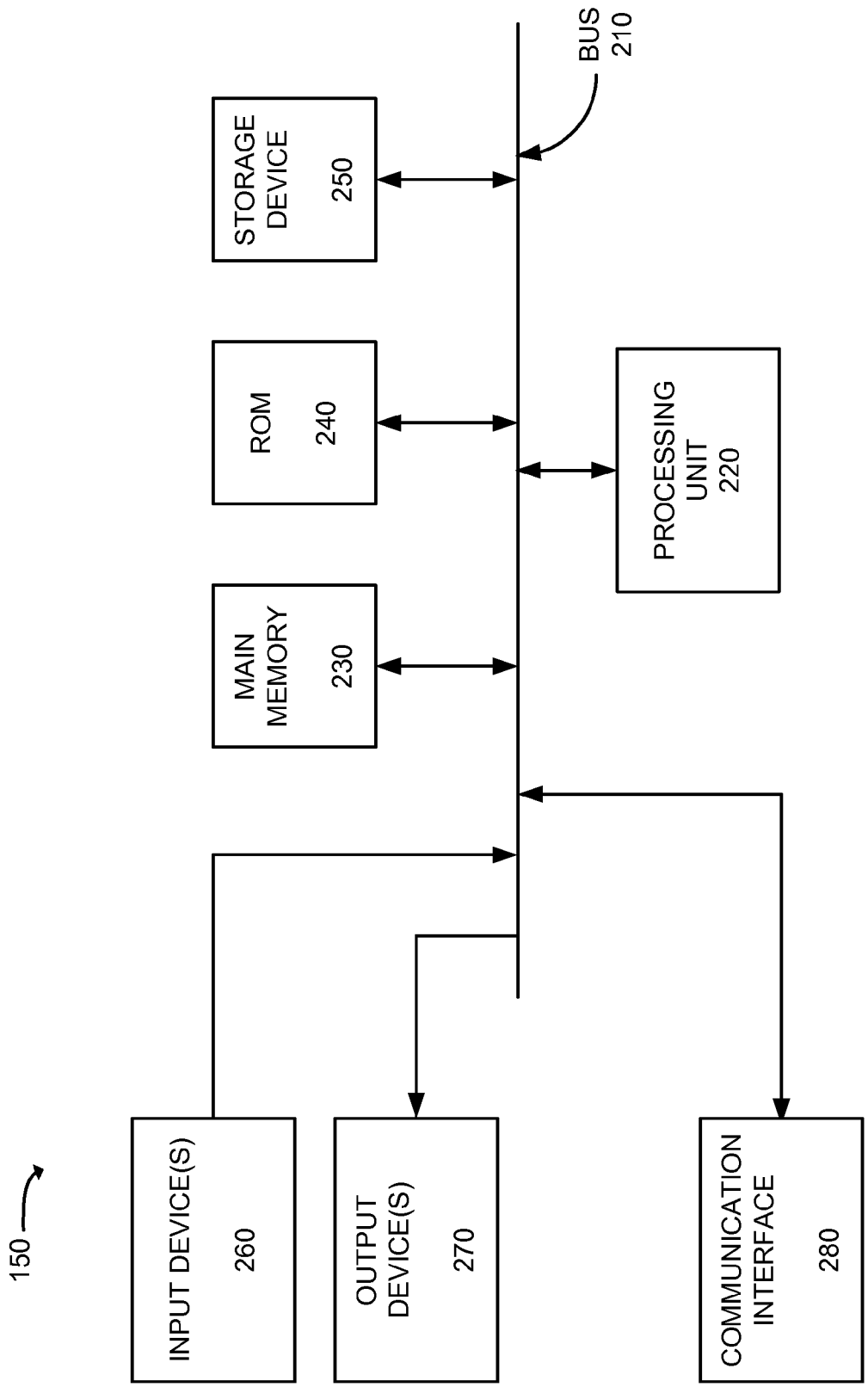
FIG. 2 is a diagram of exemplary components of the optical time domain reflectometer monitor of FIG. 1.

FIG. 2 is a diagram of exemplary components of OTDR monitor 150. OTDR monitor 150 may include a bus 210, a processing unit 220, a main memory 230, a read only memory (ROM) 240, a storage device 250, an input device(s) 260, an output device(s) 270, and a communication interface 280. Bus 210 may include a path that permits communication among the elements of OTDR monitor 150.

Processing unit 220 may include one or more processors or microprocessors, or processing logic, which interprets and executes instructions. Main memory 230 may include a random access memory (RAM) or another type of dynamic storage device that stores information and instructions for execution by processing unit 220. ROM 240 may include a ROM device or another type of static storage device that stores static information and instructions for use by processing unit 220. Storage device 250 may include a magnetic and/or optical recording medium. Main memory 230, ROM 240, and storage device 250 may each be referred to herein as a "tangible non-transient computer-readable medium."

Input device 260 may include one or more mechanisms that permit a user/operator to input information to OTDR monitor 150, such as, for example, a keypad or a keyboard, a display with a touch sensitive panel, voice recognition and/or biometric mechanisms, etc. Output device 270 may include one or more mechanisms that output information to the user/operator, including a display, a speaker, etc. Communication interface 280 may include any type of transceiver that enables OTDR monitor 150 to communicate with other devices and/or systems. For example, communication interface 280 may include wired and/or wireless transceivers for communicating with each of OTDRs 140-1 through 140-x.

OTDR monitor 150 may perform certain operations or processes, as may be described in detail below. OTDR monitor 150 may perform these operations in response to processing unit 220 executing software instructions contained in a computer-readable medium, such as memory 230. A computer-readable medium may be defined as a physical or logical memory device. A logical memory device may include memory space within a single physical memory device or spread across multiple physical memory devices.

The software instructions may be read into main memory 230 from another computer-readable medium, such as storage device 250, or from another device via communication interface 280. The software instructions contained in main memory 230 may cause processing unit 220 to perform operations or processes that will be described later. Alternatively, hardwired circuitry may be used in place of or in combination with software instructions to implement processes consistent with the principles of the invention. Thus, exemplary implementations are not limited to any specific combination of hardware circuitry and software.

The configuration of components of OTDR monitor 150 in FIG. 2 is for illustrative purposes only. Other configurations may be implemented. OTDR monitor 150 may include additional, fewer and/or different components than those depicted in FIG. 2, possibly arranged in a different configuration than that depicted in FIG. 2.

Figure 3:
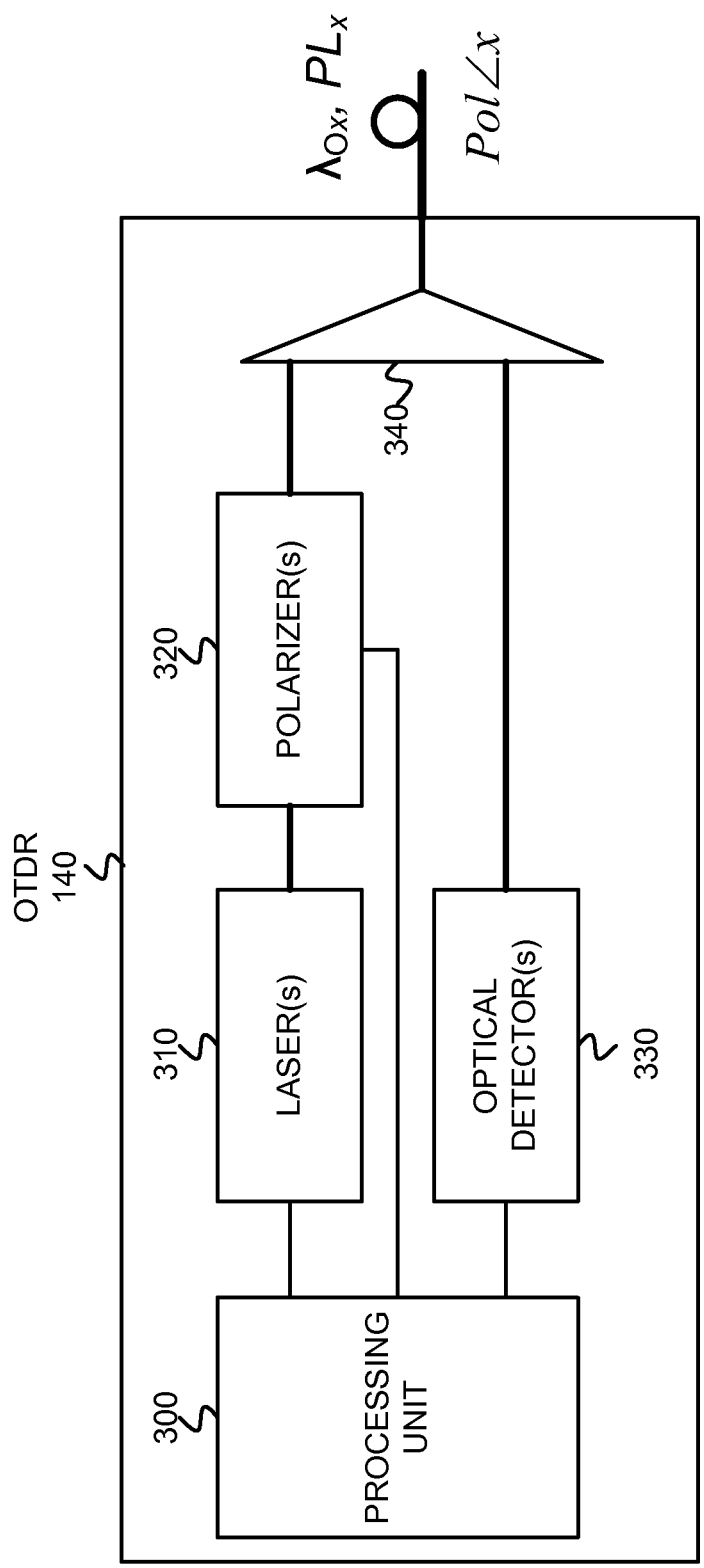
FIG. 3 is a diagram of exemplary components of an optical time domain reflectometer of FIG. 1.

FIG. 3 is a diagram of exemplary components of OTDR 140. OTDR 140 may include a processing unit 300, a laser(s) 310, a polarizer(s) 320, an optical detector(s) 330, and an optical coupler(s) 340.

Processing unit 300 may include one or more processors or microprocessors, or processing logic, which interprets and executes instructions. Processing unit 300 controls the operation of laser(s) 310, polarizer(s) 320, optical detector(s) 330, and coupler(s) 340. Laser(s) 310 includes one or more laser devices that generate optical signals comprising light of a specific wavelength, or a range of wavelengths. For example, laser(s) 310 may generate light at a wavelength of 1465 nm (S band). In one implementation, laser(s) 310 may include a single laser that generates optical signals at a certain wavelength. In a second implementation, laser(s) 310 may include a single laser that is tunable to generate optical signals at a range of optical wavelengths (e.g., 1360-1460 nm). In a third implementation, laser(s) 310 may include multiple laser devices that each generates optical signals at a different optical wavelength, and the output optical signals are multiplexed together.

Polarizer(s) 320 includes one or more light polarizing devices that adjust the polarization of optical signals generated by laser(s) 310 based on commands from processing unit 300, which are, in turn, received from OTDR monitor 150. The light polarizing device(s) of polarizer(s) 320 may adjust the polarization of the light generated by laser(s) 310 from, for example, a relative angle of zero degrees to about 90 degrees (0 degrees-90 degrees).

Optical coupler(s) 340 couples outgoing optical signals from laser(s) 310 and polarizer 320 to an output optical fiber, and couples incoming optical signals received via the optical fiber to optical detector(s) 330. Optical detector(s) 330 includes one or more devices that detect, and measure the power level of, optical signals of certain wavelengths. Optical detector(s) 330 may, for example, detect optical signals in wavelengths ranging from about 1460 nm to about 1560 nm. Optical detector(s) 330 may detect optical signals in other ranges of wavelengths.

The configuration of components of OTDR 140 in FIG. 3 is for illustrative purposes only. Other configurations may be implemented. OTDR 140 may include additional, fewer and/or different components than those depicted in FIG. 3 possibly arranged in a different configuration than that depicted in FIG. 3. For example, OTDR 140 includes a communication interface (not shown) for communicating with (e.g., receiving instructions from, and reporting signal measurements to) OTDR monitor 150. The communication interface may include wired or wireless mechanisms. OTDR 140 may additionally include one or more types of memory devices for storing information and instructions for use by processing unit 300.

Figure 4:
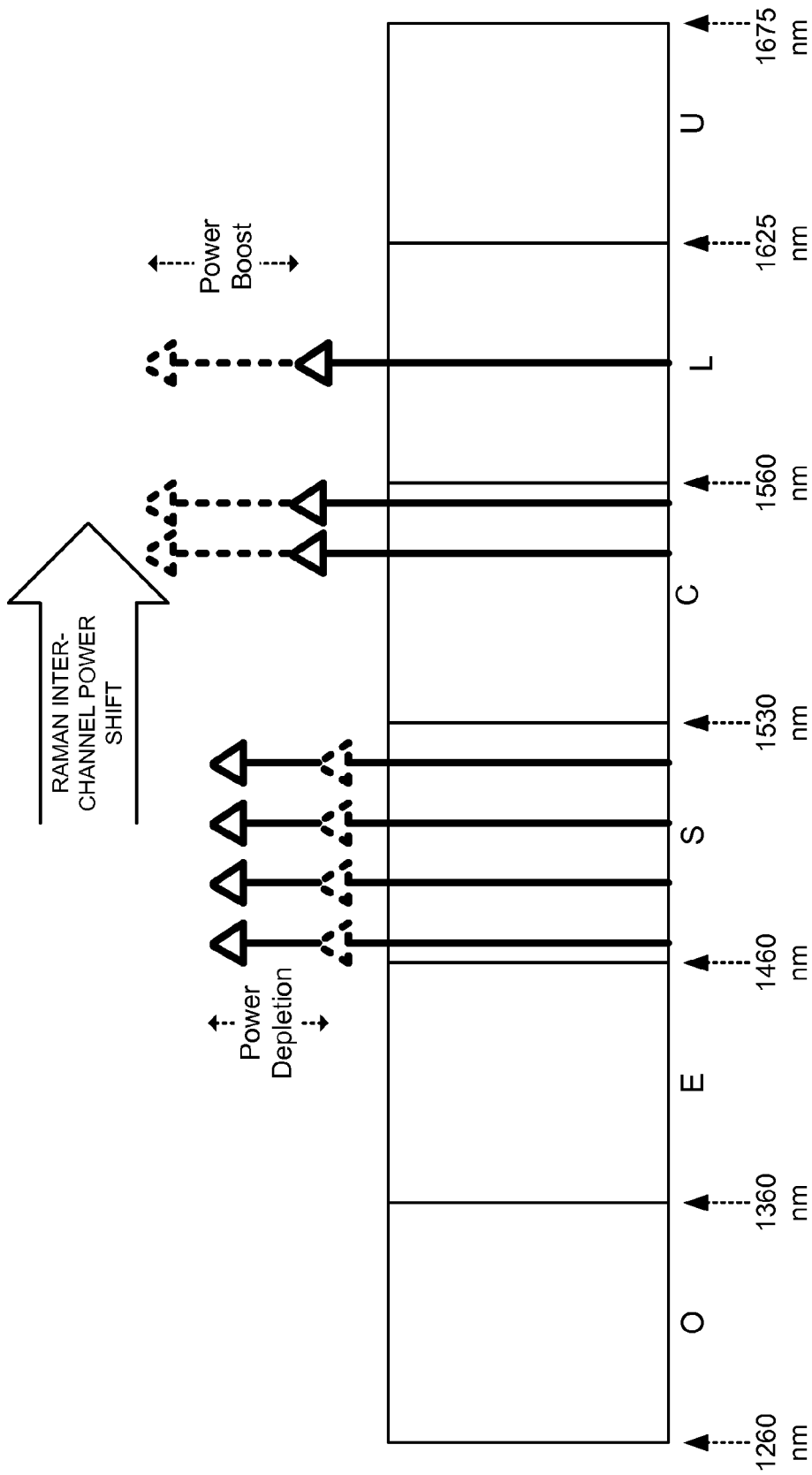
FIG. 4 is a wavelength spectrum diagram that depicts an example of inter-channel Raman power shift among multi-band optical signals.

FIG. 4 is a wavelength spectrum diagram that depicts an example of inter-channel Raman power shift that occurs among multi-band optical signals due to, for example, the non-linear nature of the optical fiber carrying the optical signals. The inter-channel Raman power shift depicted in FIG. 4 results in the power levels across multiple bands on a fiber being unbalanced (i.e., unequal) due to power depletion at lower wavelengths and corresponding power boosting at higher wavelengths. As shown in FIG. 4, optical signals may be transmitted in a lower band of multiple bands, such as, for example, the S band which includes wavelengths from 1460 nm to 1530 nm. Simultaneously, as further shown in FIG. 4, optical signals may also be transmitted in a higher band of the multiple bands, such as, for example, the C band which includes wavelengths from 1530 nm to 1560 nm, and/or the L band which includes wavelengths from 1560 nm to 1625 nm. Due to the non-linear fiber medium and the resulting phenomenon of inter-channel Raman power shift, the power level of the lower band optical signals is depleted ("power depletion" in FIG. 4) and shifted to boost the power level of the higher band optical signals ("power boost" in FIG. 4). For example, as depicted in FIG. 4, the power level of each of the optical signals in the S band is depleted, and the power is shifted to boost the power level of the optical signals in the C and L bands. As a consequence of the inter-channel Raman power shift shown in FIG. 4, power levels across multiple bands on a fiber become unbalanced, with depleted power levels at lower wavelengths, and boosted power levels at higher wavelengths.

Figure 5:
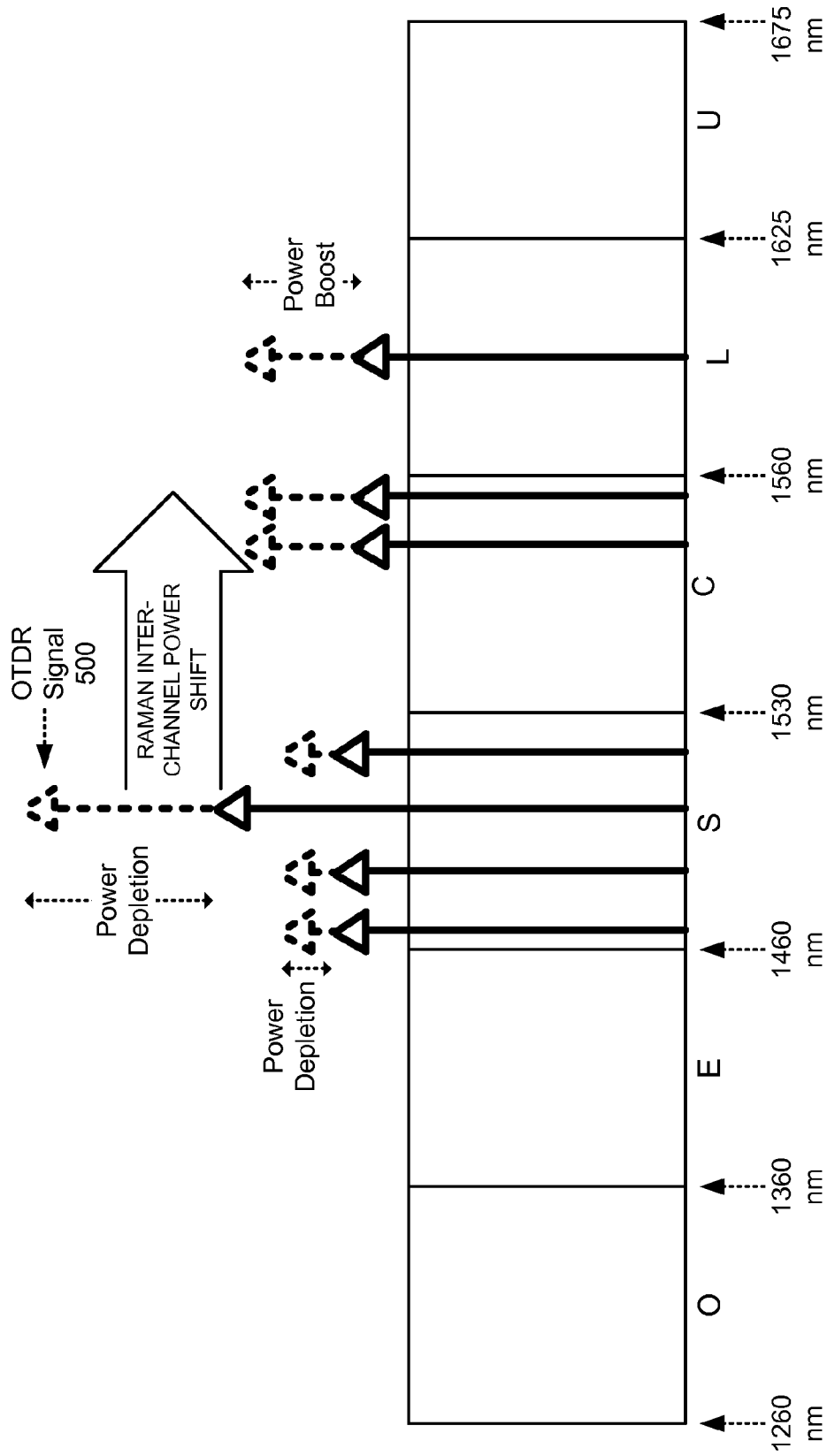
FIG. 5 is a wavelength spectrum diagram that depicts an exemplary result from the use of an optical time domain reflectometer signal, transmitted from an optical time domain reflectometer of FIG. 1, for balancing power levels of optical signals across multiple bands of wavelengths.

FIG. 5 is a wavelength spectrum diagram that depicts an exemplary result from the use of an OTDR optical signal, transmitted from an OTDR 140, for balancing power levels of optical signals across multiple bands of wavelengths. As shown in FIG. 5, a high power OTDR signal 500 may be transmitted at a lower band, such as, for example, the S band, among other optical signals carrying data traffic. Due to inter-channel Raman power shift, the power level of OTDR signal 500 is depleted ("power depletion" in FIG. 5), and the power level of other lower band signals are depleted ("power depletion" of other signals in S band in FIG. 5), and shifted to boost the power level of the higher band optical signals ("power boost" in FIG. 5). For example, as depicted in FIG. 5, power is shifted from OTDR signal 500 at a wavelength in the S band to data traffic signals in the C and L bands. The high power OTDR signal 500, therefore, among the lower band optical signals, "sacrifices" a significant amount of power compared to other optical signals in the S band, which have an insignificant power depletion. The high power OTDR signal 500, thus, acts as a "Raman pump" due to the inter-channel power shift. In a similar manner to that shown in FIG. 5, one or more OTDR signals from OTDRs 140-1 through 140-x of FIG. 1 may, therefore, be used, as described in further detail below, to balance power levels of optical signals carried by optical fiber 145 across multiple bands of wavelengths, such as the O, E, S, C, L, and U bands.

Figure 6:
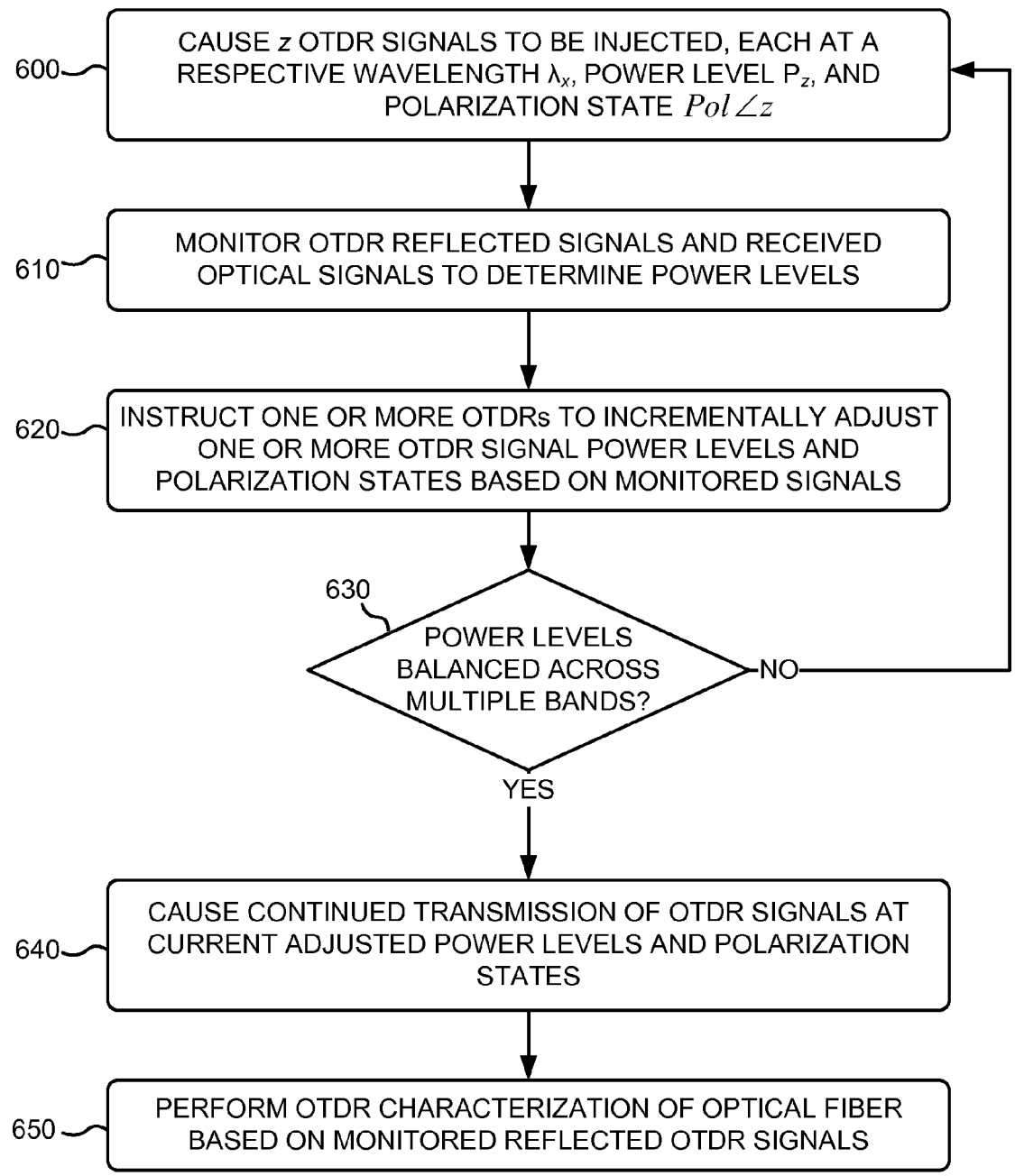
FIG. 6 is a flow diagram of an exemplary process for balancing optical power across multiple bands of wavelengths over an optical fiber.

FIG. 6 is a flow diagram of an exemplary process for balancing optical power across multiple bands of wavelengths over an optical fiber. The exemplary process of FIG. 6 may be implemented by OTDR monitor 150, in conjunction with OTDRs 140-1 through 140-x, where processing unit 220 of OTDR monitor 150 executes instructions stored in memory 230, ROM 240 or storage device 250 to perform the process of FIG. 6. In some implementations, one or more blocks of FIG. 6 may be implemented manually by an operator/technician, instead of automatically by OTDR monitor 150. The exemplary process of FIG. 6 is described with respect to the example OTDR signal transmission diagram of FIG. 7.

Figure 7:
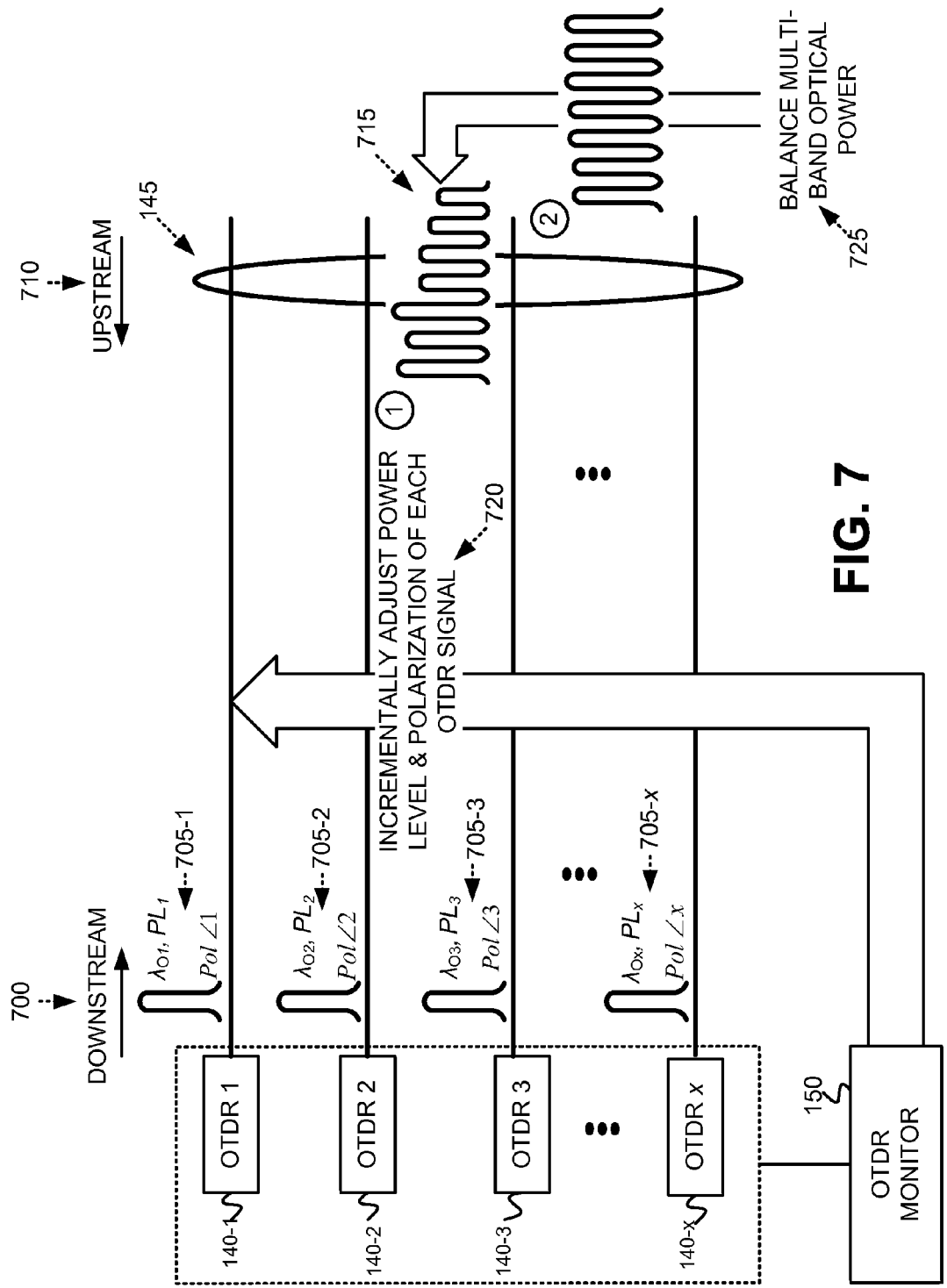
FIG. 7 is an example optical time domain reflectometer signal transmission diagram associated with the exemplary process of FIG. 6.

The exemplary process may include OTDR monitor 150 causing z (a number of) different optical signals to be transmitted from OTDRs 140-1 through 140-x, with each OTDR signal being transmitted at a respective wavelength $\lambda_x$, power level $P_z$, and polarization state Pol ∠l, where z is a positive integer that may be less than or equal to the number (x) of OTDRs (block 600). For example, as shown in FIG. 7, OTDR monitor 150 instructs OTDR 140-1 to transmit an optical signal 705-1 at a wavelength $\lambda_{O1}$, a power level $PL_1$, and at a polarization state Pol ∠1; OTDR 140-2 to transmit an optical signal 705-2 at a wavelength $\lambda_{O2}$, a power level $PL_2$, and at a polarization state Pol ∠2; OTDR 140-3 to transmit an optical signal 705-3 at a wavelength $\lambda_{O3}$, a power level $PL_3$, and at a polarization state Pol ∠3; and OTDR 140-x to transmit an optical signal 705-x at a wavelength $\lambda_{Ox}$, a power level $PL_x$, and at a polarization state Pol ∠x. Each of optical wavelengths $\lambda_{O1}$, $\lambda_{O2}$, $\lambda_{O3}$, . . . , $\lambda_{Ox}$ may be different from one another. Each of power levels $PL_1$, $PL_2$, $PL_3$, . . . , $PL_x$ may be the same as, or different than, one another. Each of polarization states Pol ∠1, Pol ∠2, Pol ∠3, . . . , Pol ∠x may be the same as, or different than, one another.

OTDR monitor 150 monitors OTDR reflected signals, and received optical signals, over optical fiber 145 to determine power levels (block 610). Optical detector(s) 330 of each OTDR 140 detects incoming optical signals received on the upstream over optical fiber 145 at one or more optical wavelengths. Optical detector(s) 330 of each OTDR 140 measures the power level at each optical wavelength associated with the received optical signals, and provides an indication of the power level and optical wavelength to OTDR monitor 150. Additionally, downstream power monitor 160 measures power levels at specific wavelengths on the downstream over optical fiber 145, and upstream power monitor 155 measures power levels at specific wavelengths on the upstream over optical fiber 145. Downstream power monitor 160 and upstream power monitor 155 report the measured power levels, and associated optical wavelengths, to OTDR monitor 150.

OTDR monitor 150 instructs one or more of OTDRs 140-1 through 140-x to incrementally adjust one or more OTDR signal power levels and/or polarization states (block 620) based on the monitored signals of block 610. The monitoring of optical signals is described with respect to block 630 below. Referring to FIG. 7, OTDR monitor 150 may instruct OTDRs 140-1, 140-2, 140-3 and/or 140-x to adjust 720 the power level (PL) and polarization state (Pol ∠) of the output OTDR signals. For example, OTDR monitor 150 may instruct OTDR 140-1 to incrementally adjust power level $PL_1$ and polarization state Pol ∠1 of OTDR signal 705-1 and/or OTDR 140-3 to incrementally adjust power level $PL_3$ and polarization state Pol ∠3 of OTDR signal 705-3. Based on the monitoring, OTDR monitor 150 selects combinations of OTDR signal wavelengths, power levels and polarization states that, when transmitted on optical fiber 145, should, via the phenomenon of inter-channel Raman power shift, move the power levels across the multiple bands towards a balanced state.

OTDR monitor 150 determines whether power levels across multiple bands of wavelengths are balanced (block 630). Each optical detector(s) 330 of OTDR 140 detects incoming optical signals on the upstream 710 of optical fiber 145, including reflected versions of OTDR signals 705-1 through 705-x, and possibly other optical signals transmitted on the upstream 710 at one or more optical wavelengths (e.g., from optical transmitters at the ONU). Optical detector(s) 330 detect the incoming optical signals at specific optical wavelengths, and measures each signal's power level. OTDR 140 reports the measurement, including the wavelength and the power level of the detected optical signal, to OTDR monitor 150. Additionally, downstream power monitor 160 measures power levels at one or more specific wavelengths on the downstream over optical fiber 145, upstream power monitor 155 measures power levels at one or more specific wavelengths on the upstream over optical fiber 145, and downstream power monitor 160 and upstream power monitor 155 report the measured power levels, and associated optical wavelengths, to OTDR monitor 150.

OTDR monitor 150 collects the wavelength and power level data received from all of OTDRs 140-1 through 140-x, and upstream power monitor 155, and analyzes the data to determine the relative power level of optical signals on the upstream 710 across multiple bands of wavelengths (e.g., O band through U band). OTDR monitor 150 also stores data of the optical wavelengths and power levels that OTDR monitor 150 instructed OTDRs 140-1 through 140-x to transmit OTDR signals at in block 600, and also data of the optical wavelengths and power levels measured by downstream power monitor 160, and analyzes that data to determine the relative power level of OTDR signals on the downstream 700 and/or on the upstream 710 across multiple bands of wavelengths (e.g., O band through U band). If the power levels measured on the downstream 700 and/or the upstream 710 on optical fiber 145 are approximately equal across multiple bands (e.g., O band through U band), then the power levels are considered to be balanced. Referring to "1" within a circle in FIG. 7, unbalanced power levels 715 are initially measured across multiple bands on optical fiber 145. Referring to "2" within a circle in FIG. 7, upon completion of one or more iterations of blocks 600 through 630, balanced power levels 725 are subsequently measured across the multiple bands on optical fiber 145.

OTDR monitor 150 causes the continued transmission of OTDR signals from OTDRs 140-1 through 140-x at current adjusted power levels and polarization angles (block 640). Once balanced multi-band optical power 725 is achieved via the iterative adjustments of block 620, OTDR monitor 150 notes the combination of output optical wavelengths, power levels and polarization states from each of OTDRs 140-1 through 140-x that achieved the balanced multi-band optical power 725, and continues instructing OTDRs 140-1 through 140-x to transmit OTDR pulses at those wavelengths, power levels and polarization states. OTDR monitor 150 performs OTDR characterization of optical fiber 145 based on the monitored reflected OTDR signals (block 650). For example, the reflected OTDR signals may be used to estimate a length of fiber 145, an overall attenuation of fiber 145, and/or an optical return loss of fiber 145. The exemplary process of FIG. 6 may be executed (e.g., repeated) continuously, periodically, or upon the occurrence of an event (e.g., initial power-up of OTDR monitor 150).

The foregoing description of implementations provides illustration and description, but is not intended to be exhaustive or to limit the invention to the precise form disclosed. Modifications and variations are possible in light of the above teachings or may be acquired from practice of the invention. While a series of blocks has been described with respect to FIG. 6, the order of the blocks may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    injecting, from at least one Optical Time Domain Reflectometer (OTDR), one or more first OTDR signals at one or more first optical wavelengths into an optical fiber;
    monitoring multi-band optical signals, including reflected OTDR signals corresponding to the first OTDR signals, on the optical fiber;
    determining parameters associated with the optical fiber based on the first OTDR signals and the monitoring;
    adjusting, at the at least one OTDR, a power level and a polarization state of one or more second OTDR signals at one or more second optical wavelengths based on the monitoring until power levels associated with the multi-band optical signals are balanced; and
    injecting, from the at least one OTDR, the one or more second OTDR signals at the one or more second optical wavelengths into the optical fiber.

2. The method of claim 1, wherein the determined parameters comprise a fiber length, an overall attenuation and/or an optical return loss of the optical fiber.

3. The method of claim 1, wherein adjusting the power level and the polarization state comprises:
    iteratively adjusting, at the at least one OTDR, the power level and the polarization state of the one or more second OTDR signals based on the monitoring until the power levels associated with the multi-band optical signals are balanced.

4. The method of claim 1, wherein the one or more first optical wavelengths are the same optical wavelengths as the one or more second optical wavelengths.

5. The method of claim 1, wherein the one or more first optical wavelengths are different optical wavelengths than the one or more second optical wavelengths.

6. A system, comprising:
    a first Optical Time Domain Reflectometer (OTDR) configured to inject a first OTDR signal at a first optical wavelength, a first power level and a first polarization state into an optical fiber,
    an OTDR monitor configured to:
        monitor multi-band optical signals, including a reflected OTDR signal corresponding to the first OTDR signal, on the optical fiber, and
        select a second power level and a second polarization state based on the monitoring of the multi-band optical signals,
        determine parameters associated with the optical fiber based on the monitoring, and
    wherein the first OTDR is further configured to inject a second OTDR signal at the first optical wavelength, the selected second power level and the selected second polarization state into the optical fiber to balance power levels associated with the multi-band optical signals.

7. The system of claim 6, wherein the OTDR monitor is further configured to:
- select a third power level and a third polarization based on the monitoring of the multi-band optical signals subsequent to injecting the second OTDR signal,
- wherein the first OTDR is further configured to inject a third OTDR signal at the first optical wavelength, the third power level and the third polarization into the optical fiber to further balance the power levels associated with the multi-band optical signals.

8. The system of claim 7, wherein third power level is different than the second power level.

9. The system of claim 7, wherein the third polarization is different than the second polarization.

10. The system of claim 6, wherein the second power level is different than the first power level.

11. The system of claim 6, wherein the second polarization is different than the first polarization.

12. The system of claim 6, further comprising:
- a second OTDR configured to inject a third OTDR signal at a second optical wavelength, a third power level and a third polarization into the optical fiber, wherein the second OTDR is configured to inject the third OTDR signal simultaneously with the first OTDR injecting the first OTDR signal; and
- wherein the OTDR monitor is further configured to:
  - select a fourth power level and a fourth polarization based on the monitoring of the multi-band optical signals,
  - wherein the second OTDR is further configured to inject a fourth OTDR signal at the second optical wavelength, the fourth power level and the fourth polarization into the optical fiber.

13. A non-transitory computer-readable medium containing instructions executable by at least one processor, the computer-readable medium comprising:
- one or more instructions for causing a first Optical Time Domain Reflectometer (OTDR) to inject one or more first OTDR signals into an optical fiber, wherein the one or more first OTDR signals have a first optical wavelength, a first power level, and a first polarization state;
- one or more instructions for monitoring multi-band optical signals, including reflected OTDR signals corresponding to the first OTDR signals, on the optical fiber; and
- one or more instructions for causing the first OTDR to inject one or more second OTDR signals into the optical fiber, based on the monitoring of the multi-band optical signals, to balance power levels associated with the multi-band optical signals, wherein the one or more second OTDR signals have a second optical wavelength, a second power level and a second polarization state.

14. The non-transitory computer-readable medium of claim 13, wherein the second optical wavelength is a same wavelength as the first optical wavelength.

15. The non-transitory computer-readable medium of claim 13, wherein the second power level is different than the first power level and the second polarization state is the same as the first polarization state.

16. The non-transitory computer-readable medium of claim 13, wherein the second power level is the same as the first power level and the second polarization state is different than the first polarization state.

17. The non-transitory computer-readable medium of claim 13, further comprising:
- one or more instructions for determining parameters associated with the optical fiber based on the one or more first or second OTDR signals and based on the monitoring of the multi-band optical signals on the optical fiber.

18. The non-transitory computer-readable medium of claim 13, wherein the one or more instructions for monitoring the multi-band optical signals on the optical fiber comprise:
- one or more instructions for monitoring power levels associated with the multi-band optical signals on the optical fiber.

19. The non-transitory computer-readable medium of claim 18, further comprising:
- one or more instructions for determining the power levels, at specific wavelengths throughout multiple bands in which the multi-band optical signals have been transmitted;
- one or more instructions for determining whether the determined power levels are balanced across the multiple bands.

20. The non-transitory computer-readable medium of claim 19, wherein the one or more instructions for causing the first OTDR to inject one or more second OTDR signals into the optical fiber further comprises:
- one or more instructions for setting the second power level different than the first power level, or the second polarization state different than the first polarization state, if the determined power levels are not balanced across the multiple bands.

* * * * *